United States Patent [19]
Yano et al.
[11] 3,896,401
[45] July 22, 1975

[54] ELECTROMECHANICAL FILTER COMPRISING ELECTROMECHANICAL RESONATORS AT LEAST ONE OF WHICH HAS DIFFERENT INPUT AND OUTPUT EQUIVALENT INDUCTANCES

[75] Inventors: Takeshi Yano; Takehiro Futami; Mototsugu Ookura, all of Tokyo, Japan

[73] Assignee: Nippon Electric Company, Limited, Tokyo, Japan

[22] Filed: Feb. 26, 1973

[21] Appl. No.: 336,123

[30] Foreign Application Priority Data

Feb. 25, 1972 Japan .............................. 47-19873

[52] U.S. Cl. .................... 333/72; 310/9.6; 310/9.8; 333/71

[51] Int. Cl. .......................... H03h 7/10; H03h 9/00

[58] Field of Search .......... 333/71, 72; 310/9.1, 9.6, 310/8.6, 9.8

[56] References Cited

UNITED STATES PATENTS

| | | | |
|---|---|---|---|
| 2,980,872 | 4/1961 | Storch | 333/72 |
| 3,054,968 | 9/1962 | Harrison | 333/72 X |
| 3,241,092 | 3/1966 | Toyoshima | 333/72 |
| 3,283,264 | 11/1966 | Papadakis | 333/72 X |
| 3,374,448 | 3/1968 | Hurtig | 333/71 X |
| 3,389,351 | 6/1968 | Trzeba et al. | 333/71 |
| 3,426,300 | 2/1969 | Er-Chun-Ho | 333/72 |
| 3,588,551 | 6/1971 | Perlman | 310/8.6 |
| 3,683,211 | 8/1972 | Perlman | 310/8.6 |

*Primary Examiner*—Saxfield Chatmon, Jr.
*Attorney, Agent, or Firm*—Sughrue, Rothwell, Mion, Zinn & Macpeak

[57] ABSTRACT

In a mechanical filter comprising a plurality of electromechanical resonators electrically connected in parallel, at least one of the electromechanical resonators is possessed of different equivalent inductances when measured from the input side and from the output side.

6 Claims, 26 Drawing Figures

ELECTROMECHANICAL FILTER COMPRISING ELECTROMECHANICAL RESONATORS AT LEAST ONE OF WHICH HAS DIFFERENT INPUT AND OUTPUT EQUIVALENT INDUCTANCES

BACKGROUND OF THE INVENTION

This invention relates to a mechanical filter comprising a plurality of electromechanical resonators, such as flexural made resonators longitudinal made resonators or tuning fork resonators, electrically connected in parallel. The mechanical filter of the type described is often called a differentially coupled mechanical filter.

A mechanical filter is widely used, in which a plurality of electromechanical resonators are electrically connected in parallel so as equivalently to form a lattice network. Each of the mechanical resonators may comprise, as will be described later with reference to the accompanying drawings, a metal piece having attached to the opposing principal surfaces thereof a pair of piezoelectric ceramic pieces, respectively. On designing the mechanical filter, it is possible to electrically connect the resonators in parallel without paying attention to the coupling between the mechanical vibrations of the respective resonators. The resonators may therefore be simple in construction. It has, however, been felt inconvenient that the mechanical filter can afford only a symmetric circuit because a symmetric circuit is incapable of providing a filter having flat delay characteristics within the passband, a filter to be used together with a parallel and a series resonance circuit connected to one and the other of the input and the output terminals of the filter, a Tchebycheff filter having compensated passband loss, or the like.

SUMMARY OF THE INVENTION

It is therefore an object of the present invention to provide a mechanical filter of the type described, which is capable of operating as a circuit other than a symmetric circuit.

It is another object of this invention to provide a mechanical filter of the type described, which is capable of operating as an asymmetric circuit.

It is still another object of this invention to provide a mechanical filter of the type described, which is capable of operating as a filter having flat delay characteristics, namely, linear phase characteristics.

It is yet another object of this invention to provide a mechanical filter of the type described to be used together with a parallel and a series resonance circuit connected to one and the other of the input and the output terminals of the filter.

In accordance with this invention, there is provided a electromechanical filter comprising a plurality of electromechanical resonators electrically connected in parallel wherein at least one of the mechanical resonators is provided with different equivalent inductances when measured from the input side and from the output side.

DESCRIPTION OF THE PREFERRED EMBODIMENTS

Figure 1:
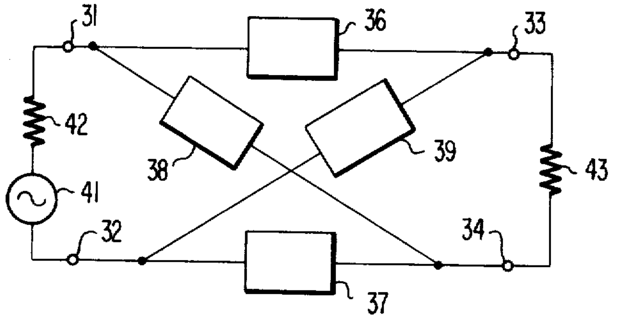
FIG. 1 is the fundamental circuit of a mechanical filter to which the instant invention is applicable.

Referring to FIG. 1, the fundamental circuit of a mechanical filter of the type described is a lattice network comprising a pair of input terminals 31 and 32, a pair of output terminals 33 and 34, and four reactance circuits 36, 37, 38, and 39 connected as shown. A signal source 41 having an internal impedance illustrated with a resistor 42 supplies a signal to a load 43 through the filter. For a conventional mechanical filter, the reactance of two of the reactance circuits 36 and 37 is $Z_1$ while the reactance of the other two reactance circuits 38 and 39 is $Z_2$. The fundamental circuit of a conventional mechanical filter is therefore a symmetric circuit where the first column first row element $Y_{11}$ of the Y matrix is equal to the second column second row element $Y_{22}$. In connection with a symmetric circuit, it is known that its characteristic function $\phi(p)$ is an odd function and consequently that the mechanical filter can not have some of the desired characteristics because of the odd function nature of the characteristic function. More particularly, the roots of the characteristic function (the roots of the denominator polynomial and the numerator polynomial) are given either by a pair of conjugate points $(p+jq)$ and $(p-jq)$ placed on the imaginary axis or by four points $[p+(r+jx)]$, $[p+(r-jx)]$, $[p-(r+jx)]$, and $[p-(r-jx)]$ placed in symmetry with respect to the origin, where $p$ represents $j\omega$ ($\omega$ being the angular frequency) and $q$, $r$, and $x$ represent real numbers. It is therefore impossible to realize a mechanical filter of the type described whose characteristic function has a pair of conjugate roots $[p+(r+jx)]$ and $[p+(r-jx)]$ which are not placed on the imaginary axis.

Figure 2:
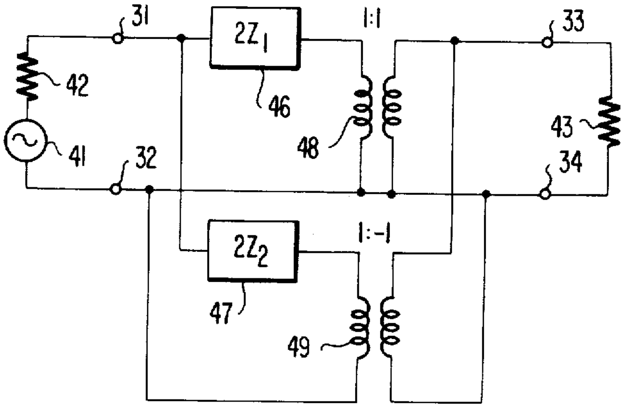
FIG. 2 is an equivalent circuit of the fundamental circuit shown in FIG. 1.

Referring to FIG. 2, an equivalent circuit of the fundamental circuit comprises two reactance circuits 46 and 47 and two ideal transformers 48 and 49 connected as shown. The reactances of the reactance circuits 46 and 47 are $2Z_1$ and $2Z_2$, respectively. The turn ratios of the transformers 48 and 49 are 1:1 for the reactance circuit 46 of the reactance $2Z_1$ and 1:(−1) for the other reactance circuit 47 of the reactance $2Z_2$.

Figure 3:
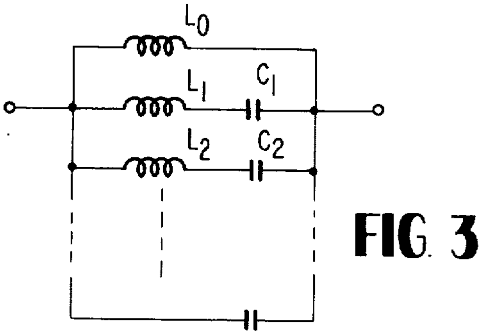
FIG. 3 is a practical circuit of a resonance circuit depicted in FIG. 2.

Referring to FIG. 3, each of the reactance circuits 46 and 47 may comprise a single inductance element $L_0$ and a plurality of series resonance circuits composed of inductance elements, such as $L_1$, $L_2$, . . . , and capacitive elements, such as $C_1$, $C_2$, . . . . The single inductance element $L_0$ and the series resonance circuits are connected in parallel. Through a mathematical analysis of decomposing the reactance $2Z_1$ or $2Z_2$ into partial fractions, it is possible to show that the reactance circuit shown in FIG. 3 is a practical circuit for each of the reactance circuits 46 and 47.

Figures 4, 7, 8, 9:
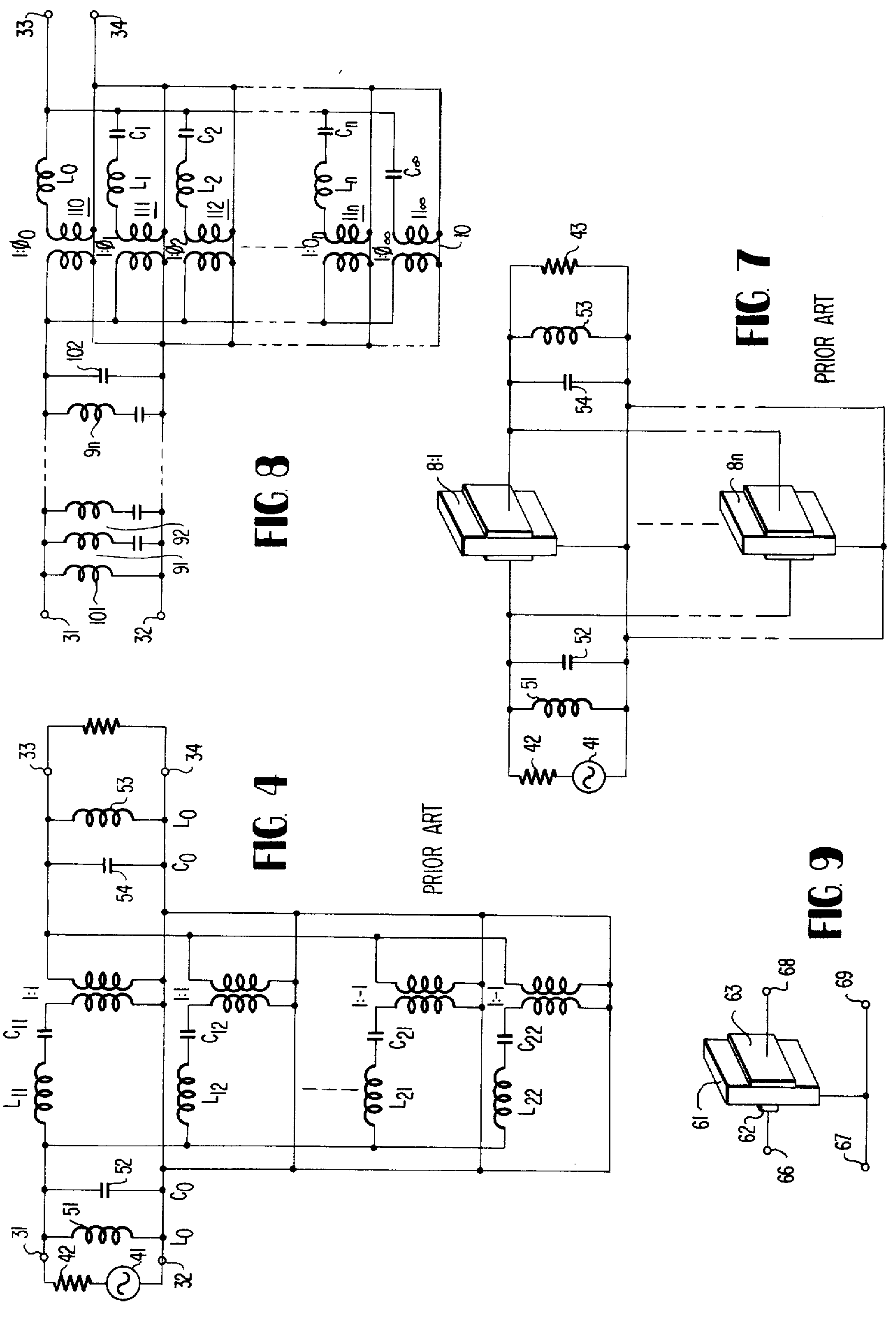
FIG. 8, FIG. 7 PRIOR ART, FIG. 4 PRIOR ART, FIG. 9
FIG. 4 is an equivalent circuit of a mechanical filter of the type described.
FIG. 7 shows the circuit of a conventional mechanical filter of the type described.
FIG. 8 is an equivalent circuit corresponding to FIG. 4.
FIG. 9 is a schematic perspective view of a flexural mode resonator used together with the resonators of the type shown in FIG. 5 in a mechanical filter according to this invention.

Referring to FIG. 4, an equivalent circuit of a mechanical filter of the type described comprises an input inductance element 51 of the inductance $L_0$, an input capacitive element 52 of the capacity $C_0$, an output inductance element 53 of the inductance $L_0$, an output capacitive element 54 of the capacity $C_0$, a plurality of first series resanance circuits comprising inductance elements $L_{11}$, $L_{12}$, . . . and capacitive elements $C_{11}$, $C_{12}$, . . . , a plurality of first transformers of the turn ratio 1:1, a plurality of second series resonance circuits comprising inductance elements $L_{21}$, $L_{22}$, . . . and capacitive elements $C_{21}$, $C_{22}$, . . . , and a plurality of second transformers of the turn ratio 1:(−1), all being connected as shown.

Figure 5:
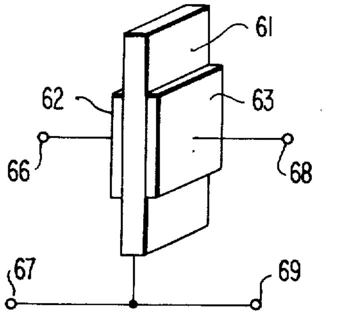
FIG. 5 is a schematic perspective view of a flexural mode resonator used in plurality in a mechanical filter according to this invention.

Referring to FIG. 5, a conventional flexural mode resonator which is used also in an electromechanical filter according to this invention comprises a piece 61 of elastically invariable metal having a pair of opposing principal surfaces, a first and a second piezoelectric ceramic piece 62 and 63 attached to the principal surfaces, respectively, a first pair of terminals 66 and 67 connected to the first ceramic piece 62 and to the metal piece 61, respectively, and a second pair of terminals 68 and 69 connected to the second ceramic piece 63 and to one of the first terminals 67 that is connected to the metal piece 61, respectively. As is known in the art, each of the ceramic pieces 62 and 63 has silver electrodes on both principal surfaces thereof and poled. The ceramic pieces 62 and 63 have similar dimensions.

Figure 6:
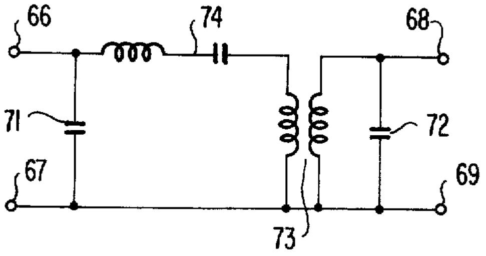
FIG. 6 is an equivalent circuit of the resonator illustrated in FIG. 5.

Referring to FIG. 6, an equivalent circuit of the resonator illustrated with reference to FIG. 5 comprises in the manner known in the art an input capacitor 71 connected between the first terminal pair 66 and 67, an output capacitor 72 connected between the second terminal pair 68 and 69, an ideal transformer 73 whose secondary winding is connected across the output capacitor 72, and a series circuit 74 of an inductance element and a capacitor connected between one end of the primary winding of the transformer 73 and one of the first terminals 66. The turn ratio of the transformer 73 is either 1:1 or 1:(−1) depending on the directions in which the ceramic pieces 62 and 63 are poled, respectively.

Referring to FIG. 7 and FIGS. 4 and 6 as well, it is obvious that a mechanical filter may be obtained by connecting in parallel a plurality of the flexural mode resonators 81, . . . , and **8*n*, such as illustrated with reference to FIG. 5. In a conventional mechanical filter of the type described, the pairs of ceramic pieces, such as 62 and 63**, may have different dimensions but the ceramic pieces of each pair have similar dimensions.

Referring back to FIG. 1, the elements of the Y matrix of a two-terminal-pair reactance circuit may be decomposed into partial fractions in the known manner, such as described by W. Cawer in "Construction of Linear Transmission Circuit," published by McGraw-Hill. The results may be written as follows:

$$Y_{11} = pA_\infty + A_0/p + \Sigma pA_i/(p^2 + q^2 i), \quad (1)$$

$$Y_{12} = Y_{21} = pB_\infty + B_0/p + \Sigma pB_i/(p^2 + q^2 i), \quad (2)$$

and $$Y_{22} = pC_\infty + C_0/p + \Sigma pC_i/(p^2 + q^2 i), \quad (3)$$

where $$A_iC_i - B_i^2 \geq O, \quad (4)$$

for $i = 0, 1, 2, \ldots, n$, and $_\infty$ and where A, B, and C are real coefficients. It is therefore possible to give the Y matrix with a sum of $n+2$ matrices corresponding to the respective terms in the righthand side of Equations (1) through (3).

Referring now to FIG. 8, a circuit having a Y matrix given by the sum of $n+2$ matrices mentioned above comprises a plurality of series resonance circuits 91, 92, . . . , and **9*n*, a single inductance element 101, a single capacitive element 102, a first four-terminal network 110 comprising an ideal transformer of the turn ratio $1:\phi_0$ and an inductance element $L_0$, a second four-terminal network 11∞ comprising an ideal transformer of the turn ratio $1:\phi_\infty$ and a capacitive element $C_\infty$, and $n$+2 four-terminal networks 111, 112, . . . , 11*n***, 11∞, each comprising an ideal transformer of the turn ratio $1:\phi_1$, $1:\phi_2$, . . . , $1:\phi_n$, $1:\Phi_\infty$, an inductance element $L_1$, $L_2$, . . . , $L_n$, and $1:\Phi_\infty$, and a capacitive element $C_1$, $C_2$, . . . , $C_n$, $C_\infty$, all connected as shown. Some of the turn ratios may be positive real numbers while the others are negative real numbers.

Referring to FIG. 9, a flexural mode resonator to be used in an electromechanical filter according to this invention in place of each of at least one of the resonators 81, . . . , and **8*n* illustrated with reference to FIG. 7 comprises a flexual piece 61 of elastically invariant metal having a pair of opposing principal surfaces, a first and a second piezoelectric ceramic piece 62 and 63 bonded to the respective principal surfaces of the metal piece 61, a first pair of terminals 66 and 67 connected to the first ceramic piece 62 and to the metal piece 61, respectively, and a second pair of terminals 68 and 69 connected to the second ceramic piece 63 and to one of the first terminals 67 that is connected to the metal piece 61, respectively. As described, each of the ceramic pieces 62 and 63 has silver electrodes on both principal surfaces thereof and poled. In contrast to the resonator illustrated with reference to FIG. 5, the ceramic pieces 62 and 63 of the resonator shown in FIG. 9 have different dimensions. It may be assumed here that the first pair of terminals 66 and 67 serve as the input terminals and that the ceramic piece 62 situated on the input side has smaller area than the output-side ceramic piece 63. In this event, it should be noted that the electric charge induced on the input-side ceramic piece 62 is less in amount than that induced on the output-side ceramic piece 63**.

Figures 10, 11:
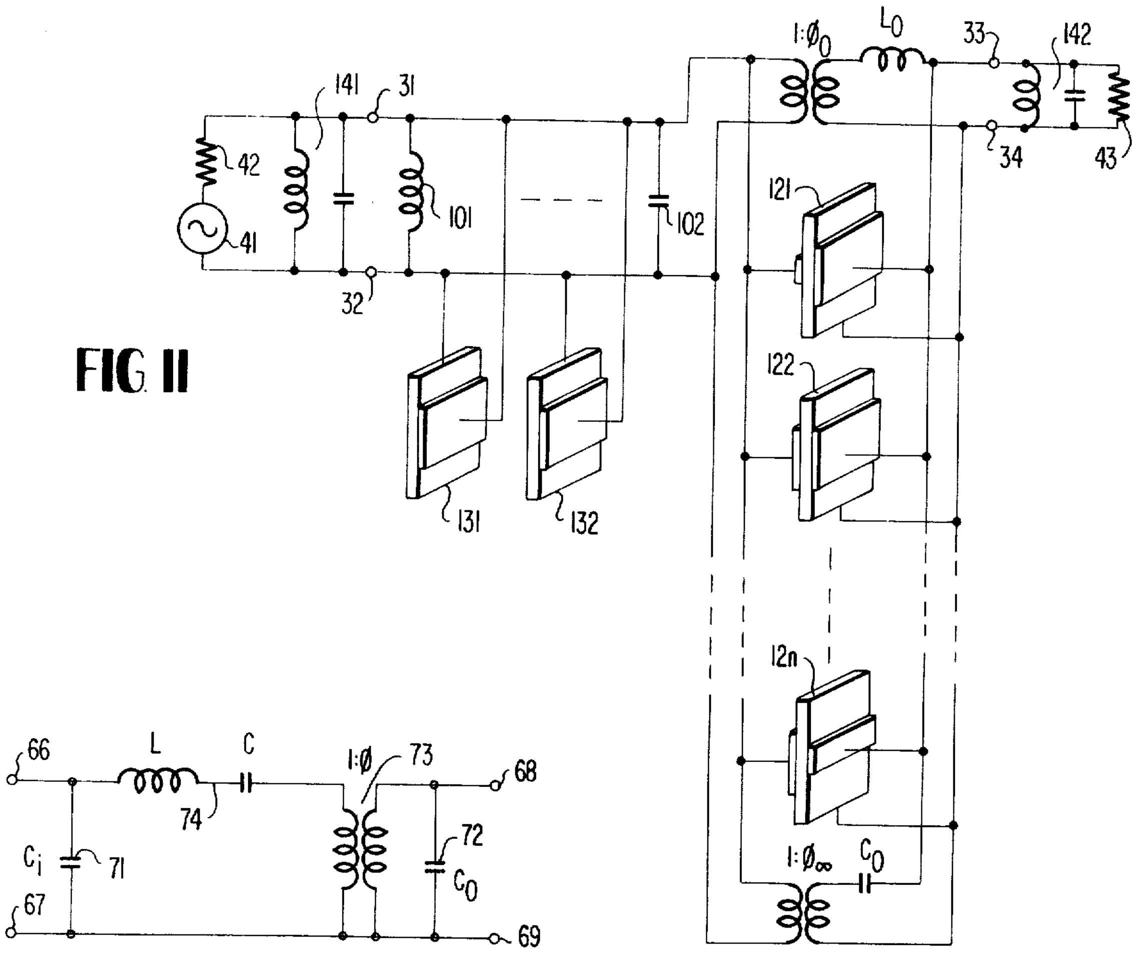
FIG. 10 is an equivalent circuit of the resonator depicted in FIG. 9.
FIG. 11 shows the circuit of a mechanical filter according to this invention.

Referring to FIG. 10, an equivalent circuit of the resonator shown in FIG. 9 is substantially a reproduction of the circuit depicted in FIG. 6. In compliance with the different amounts of electric charge induced on the input-side and the output-side ceramic pieces 62 and 63, respectively, the turn ratio of the ideal transformer 73 is now $1:\phi$ rather than 1:1 or 1:(−1). The absolute value of $\phi$ is less than unity and the sign thereof depends on the directions in which the respective ceramic pieces 62 and 63 are poled. In addition, the electrostatic capacity $C_i$ provided by the input-side ceramic piece 62 is less than the electrostatic capacity $C_o$ provided by the output-side ceramic piece 63. The resonator has equivalent inductance L when measured from the input side and equivalent inductance $\phi^2L$ when measured from the output side. Incidentally, it is possible to replace the ideal transformer 73 onto the input side.

Referring to FIG. 11, the description given above in connection with FIG. 10 readily reveals that it is possible to realize the equivalent circuit shown in FIG. 8 with the use of a plurality of resonators 121, 122, . . . , and 12*n*. In FIG. 11, a first one of the resonators 121 has smaller area input-side ceramic piece and the last one 12*n* has greater area input-side ceramic piece. In addition, the series resonance circuits 91, 92, . . . , and 9*n* are realized by similar resonators 131, . . . , and 13*n*, each having common input-output terminals, in the manner known in the art. As is often the case, a first and a second parallel resonance circuit 141 and 142 are interposed between the signal source 41 and the input terminals 31 and 32 of the mechanical filter and between the output terminals 33 and 34 and the load 43, respectively. In the example illustrated, the mechanical filter forms a single filter together with the parallel resonance circuits 141 and 142.

Figure 12:
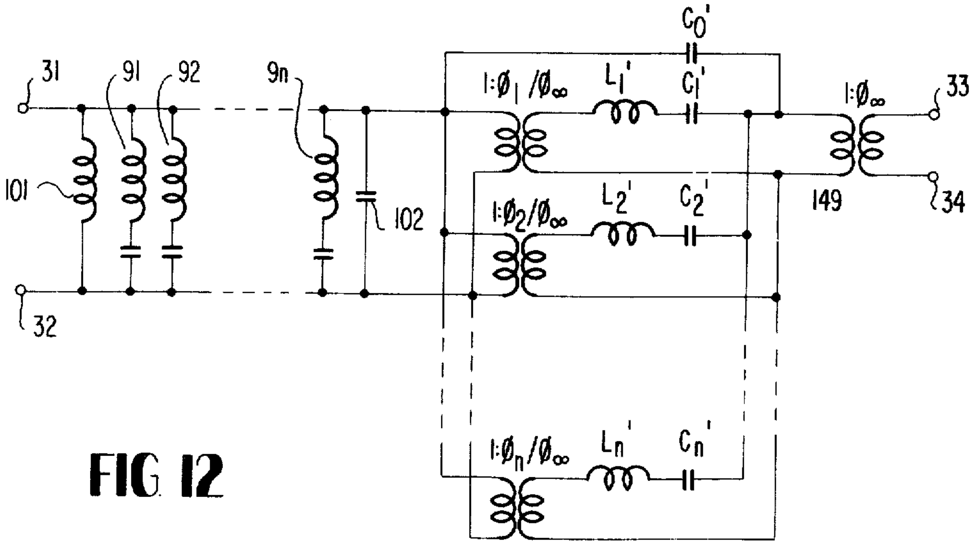
FIG. 12 is another equivalent circuit corresponding to FIG. 4.

Referring to FIG. 12 and FIG. 8 as well, it should be mentioned that it is difficult in practice to provide turn ratios $1:\phi_0$ and $1:\phi_\infty$ with values other than 1:1 and 1:(−1). On the contrary, it is desirable that these turn ratios be 1:1 because such ideal transformers are realized by directly interconnecting the primary and the secondary sides. If only one of the inductance $L_0$ and the capacity $C_\infty$ is present, it is sufficient that the impedance at the corresponding one of the input and the output terminals 31 and 32 or 33 and 34 be inverted. For a filter in which, for example, the inductance $L_0$ is not present, the equivalent circuit shown in FIG. 8 is converted into that depicted in FIG. 12 wherein an ideal transformer 149 of the turn ratio $1:\phi_\infty$ is interposed between the parallel ideal transformer networks and the output terminals 33 and 34. The turn ratios of the ideal transformers in the parallel circuits should have the respective values divided by $\phi_\infty$ while the impedances $L_1'$ and $C_1'$, $L_2'$ and $C_2'$, . . . , and $L_n'$ and $C_n'$ should have the respective values divided by $\phi_\infty^2$. If some of the residues of Equation (4) satisfy equalities $$A_i^2C_i^2 - B_i^2 = 0, \qquad (5)$$

it becomes possible to dispense with those resonance circuits shown in FIG. 8 between the input terminals 31 and 32 which corresponds to the residues (Cf.: Page 30 of "RC Kairomô" (RC Networks) written by Ozaki-Hirosi and published by Kyôritu Syuppan KK.). If Equations (5) hold for all residues, all resonance circuits 91, 92, . . . , and 9*n*, namely, all resonators 131, . . . , and 13*n* illustrated in FIG. 11 are unnecessary. For practical filters, it is often the case that at least some of Equations (5) hold.

Figure 13:
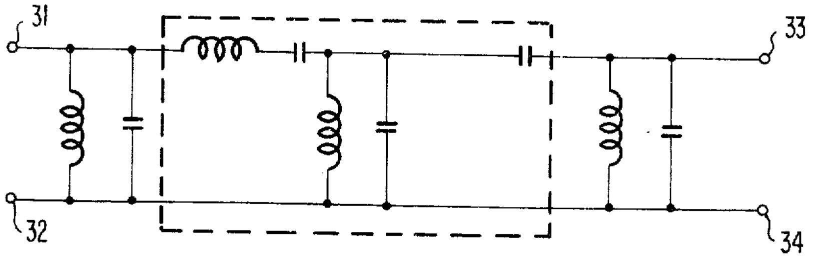
FIG. 13 shows a circuit of a fundamental linear phase band-pass filter, with the frequency band converted.

Referring now to FIG. 13, a fundamental band-pass filter having linear phase characteristics is shown with conversion of the frequency band.

Figure 14:
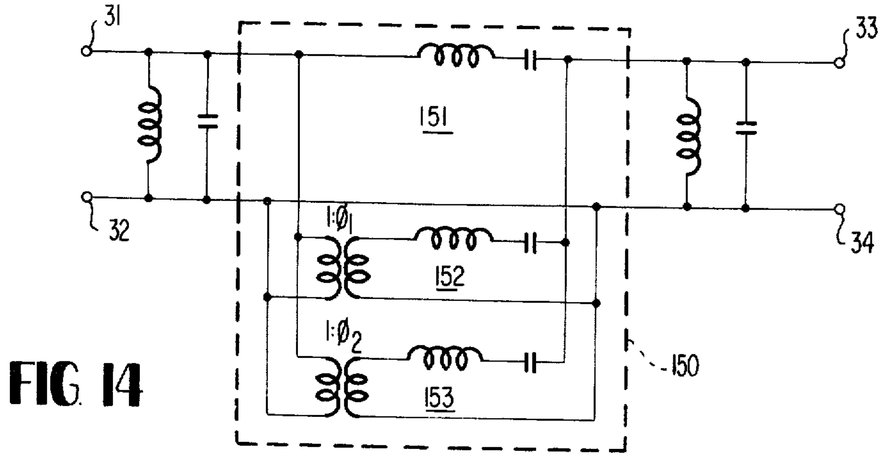
FIG. 14 is an equivalent circuit of the circuit illustrated in FIG. 13.

Referring to FIG. 14 as well as FIG. 13, decomposition into partial fractions of the Y matrix of the portion enclosed in FIG. 13 with broken lines gives a portion 150 shown in FIG. 14 enclosed with broken lines. The portion 150 comprises a parallel circuit of three networks 151, 152, and 153. The first network 151 comprises a series resonance circuit. The second and the third networks 152 and 153 comprise ideal transformers of the turn ratios $1:\phi_1$ and $1:\phi_2$ and accompanying series resonance circuits. The residues for the three resonance circuits satisfy Equations (5). The turn ratios $\phi_1$ and $\phi_2$ are about −0.40. There are no residues for $i = 0$ and $i = \infty$. It is therefore possible to realize the three networks by three flexural mode resonators.

Figure 15:
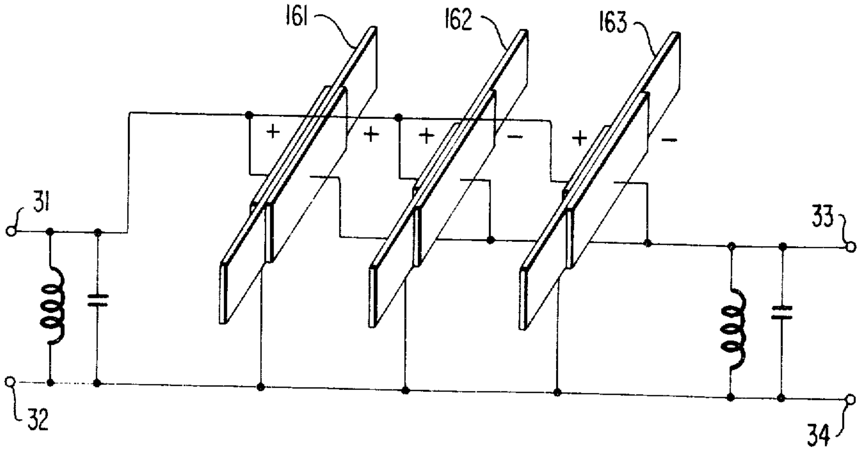
FIG. 15 is a schematic view of a band-pass mechanical filter according to this invention, which has linear phase characteristics.

Referring to FIG. 15, a practical band-pass filter having linear phase characteristics comprises three flexural mode resonators 161, 162, and 163 corresponding to the three networks 151 through 153, respectively. Each of the resonators 161 through 163 vibrates in the flexural mode. The first resonator 161 is of the type illustrated with reference to FIG. 5 and has ceramic pieces poled antiparallel. Each of the second and the third resonators 162 and 163 has smaller area input-side ceramic piece which is poled parallel to the direction in which the larger area output-side ceramic piece is poled. The metal pieces of the resonators 161 through 163 are connected to corresponding ones of the input and the output terminals 32 and 34. The ceramic pieces of each of the input and the output sides are electrically connected in parallel. Each of the resonators 161 through 163 may be held by a fine wire at about 20 percent of the whole length of the resonator.

Figure 16:
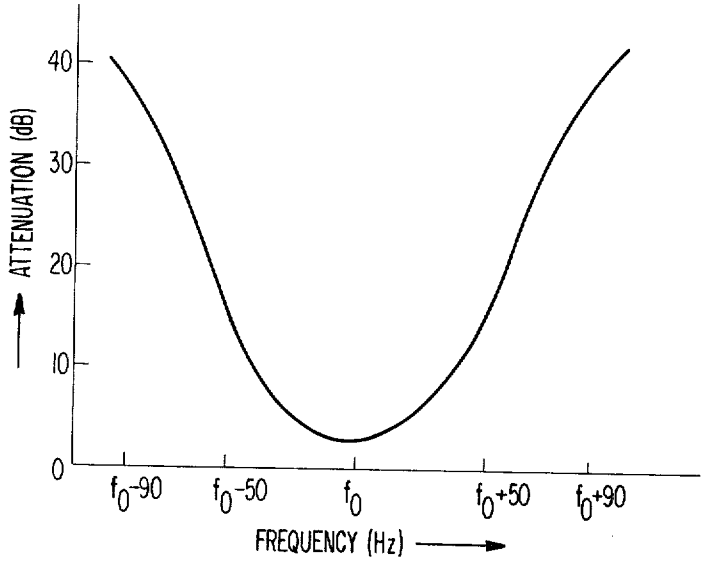
FIG. 16 shows the attenuation characteristics of the filter shown in FIG. 15.

FIG. 16 shows the attenuation versus frequency characteristics as actually measured with the example illustrated in conjunction with FIG. 15. With the equivalent inductance of the first resonator 161 reduced, it is possible to provide attenuation poles.

Figure 17:
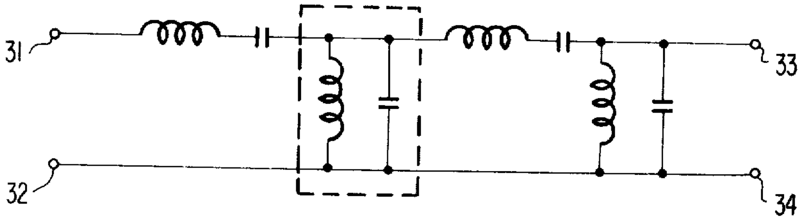
FIG. 17 shows a circuit of a band-pass filter having a series resonance circuit connected to the input terminals and a parallel resonance circuit connected to the output terminals.

Referring now to FIG. 17, an asymmetric band-pass filter having a series and a parallel resonance circuit on the input and the output sides, respectively, is shown with conversion of the frequency band.

Figure 18:
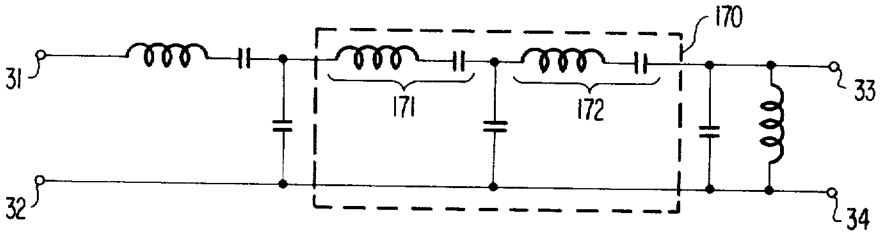
FIG. 18 shows a circuit of the filter depicted in FIG. 17, as converted with an imaginary gyrator.

Referring to FIG. 18, gyrator conversion effected by the use of an imaginary gyrator in the position enclosed in FIG. 17 by broken lines gives a portion 170 illustrated in FIG. 18 enclosed with broken lines. The portion 170 comprises two resonance circuits 171 and 172. The resonance frequency $f_1$ of the prior-stage resonance circuit 171 is lower than the resonance frequency $f_2$ of the latter-stage resonance circuit 172. Accordingly, the portion 170 is not a symmetric circuit and never be realized with a conventional mechanical filter.

Figure 19:
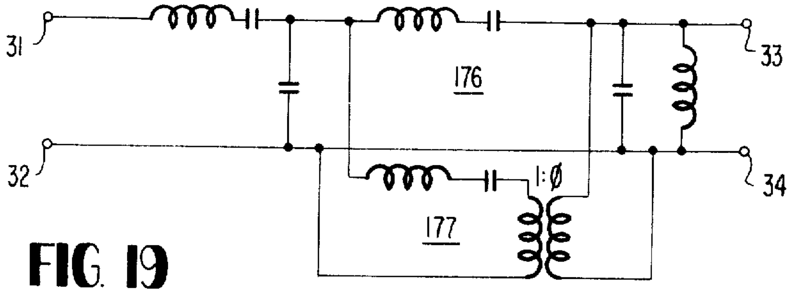
FIG. 19 is an equivalent circuit of the circuit illustrated in FIG. 18.

Referring to FIG. 19, decomposition into partial fractions of the Y matrix of the portion 170 results in a parallel circuit of a series resonance circuit 176 and a network 177 comprising an ideal transformer of the turn ratio $1:\phi$ and a series resonance circuit. The condition given by Equation (5) is satisfied. The absolute value of the turn ratio $\phi$ is not equal to 1. The sign is negative. It is now possible to realize the circuit 176 and the network 177 by acoustic element resonators, respectively.

Figure 20:
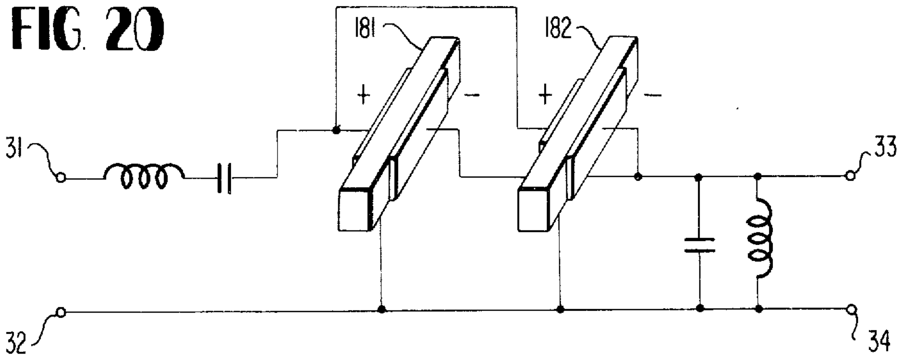
FIG. 20 is a schematic view of a band-pass mechanical filter according to this invention, which is accompanied by a series resonance circuit and a parallel resonance circuit connected to the input and the output terminals, respectively.

Referring to FIG. 20, a practical band-pass filter having a series and a parallel resonance circuit connected to the input terminals 31 and 32 and to the output terminals 33 and 34, respectively, comprises two longitudinal mode resonators 181 and 182 corresponding to the series resonance circuit 176 and the network 177, respectively. The first resonator 181 is of the style illustrated with reference to FIG. 5 and has ceramic pieces poled parallel. The second resonator 182 has narrower area input-side ceramic piece poled antiparallel to the direction in which the wider area output-side ceramic piece is poled. With use of additional capacitors connected across the resonators 181 and 182, it is possible to provide attenuation poles.

Figure 21A:
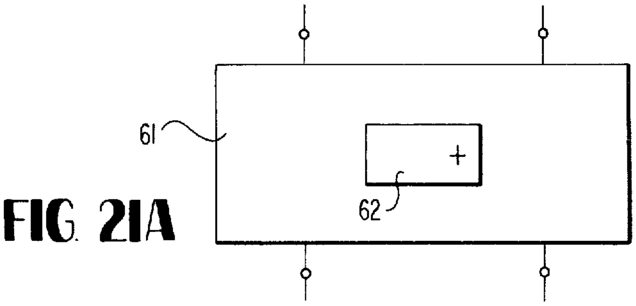
FIGS. 21A and 21B show side views of a flexural mode resonator which may be used in a mechanical filter according to this invention.
Figure 21B:
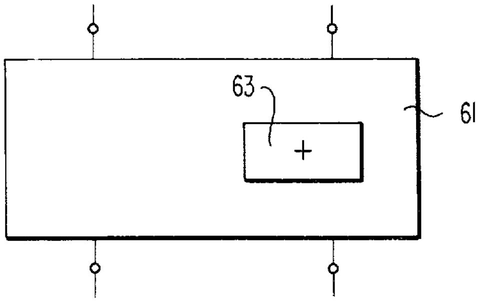

Referring now to FIGS. 21A and 21B, another example of the mechanical resonators exhibiting different equivalent inductances when measured from the input side and from the output side comprises a piece 61 of elastically invariable metal having a pair of opposing principal surfaces, a first piezoelectric ceramic piece 62 attached to one of the principal surfaces at its center as shown in FIG. 21A, a second piezoelectric ceramic piece 63 bonded to the other of the principal surfaces at an offset position as shown in FIG. 21B, and symbolically depicted input and output leads. Here, the area of the first piezoelectric ceramic piece 62 is equal to that of the second piezoelectric ceramic piece 63. The equivalent inductance L seen from the face illustrated in FIG. 21A is larger than that $\phi^2$L seen from the face depicted in FIG. 21B. This flexural mode resonator, therefore, corresponds to an ideal transformer of the positive turn ratio greater than unity if the side shown in FIG. 21A is used as the input side. The input electrostatic capacity $C_i$ is equal to the output electrostatic capacity $C_o$.

Figure 22:
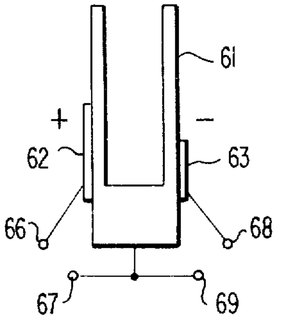
FIG. 22 is a schematic side view of a tuning fork resonator which may be used in a mechanical filter according to this invention.

Referring to FIG. 22, still another example of the mechanical resonator of the kind comprises a piece 61 of elastically invariant metal having a shape of a tuning fork, a first piezoelectric ceramic piece 62 attached to one of the outer face of one of the prongs of the tuning fork, a second piezoelectric ceramic piece 63 attached to the outer face of the other prong, a first pair of terminals 66 and 67 connected to the first piezoelectric ceramic piece 62 and to the metal piece 61, respectively, and a second pair of terminals 68 and 69 connected to the second piezoelectric ceramic piece 63 and to one of the first terminals 67 that is connected to the metal piece 61, respectively. In this example, the area of the first piezoelectric ceramic piece 62 is wider than that of the second piezoelectric ceramic piece 63. If the first terminals 66 and 67 are used as the input terminals, the absolute value of the turn ratio $\phi$ of the ideal transformer of the equivalent circuit is greater than 1. The sign of the turn ratio $\phi$ is negative.

Figures 23A, 23B, 23C:
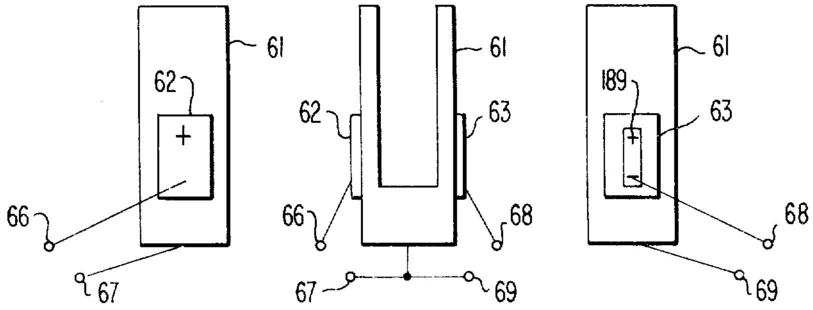
FIGS. 23A, 23B and 23C show elevational views of another tuning fork resonator which may be used in a mechanical filter according to this invention.

Referring to FIGS. 23A, 23B and 23C, another example of the tuning fork resonators comprises parts 61 through 63 and 66 through 68 corresponding to those illustrated with like reference numerals in FIGS. 5, 9, 21, and 22. The piezoelectric ceramic pieces 62 and 63 have similar areas. The peripheral portion of the silver electrode baked to the exposed surface of the second piezoelectric ceramic piece 63 is, however, removed to leave an exposed silver electrode 189 of a small area as shown on the right side view of the tuning fork resonator. This gives substantially the same effect as is the case wherein the area of the second ceramic piece 63 is reduced.

What is claimed is:

1. An electromechanical filter having a plurality of electromechanical resonators electrically connected in parallel, wherein the improvement comprises at least one electromechanical resonator whose equivalent inductance measured from the input side and whose equivalent inductance measured from the output side are different, said at least one electromechanial resonator comprising a piece capable of being set into mechanical vibration in a predetermined mode, first and second piezoelectric ceramic pieces, and means for supplying electric power across each of said ceramic pieces, said ceramic pieces being attached to said piece over predetermined effective areas, respectively, so as to set said piece into said vibration when electric power is supplied thereto, said effective areas being different.

2. An electromechanical filter as claimed in claim 1, wherein said first and said second ceramic pieces have different areas of contact with said piece.

3. An electromechanical filter as claimed in claim 1, wherein one of said first and said second ceramic pieces is attached to said piece in offset position relative to the other of said ceramic pieces.

4. An electromechanical filter as claimed in claim 1, wherein said electric power supplying means comprises a pair of electrodes covering the opposing surfaces of the individual ceramic pieces and the area of one of said electrodes is made different from the areas of the other electrodes.

5. An electromechanical filter as claimed in claim 1, wherein the number of said electromechanical resonators is three, two of said electromechanical resonators having different equivalent inductances when measured from the input side and from the output side.

6. An electromechanical filter as claimed in claim 1, wherein the number of said electromechanical resonators is two, one of said electromechanical resonators having different equivalent inductances when measured from the input side and from the output side.

* * * * *

UNITED STATES PATENT AND TRADEMARK OFFICE

CERTIFICATE OF CORRECTION

PATENT NO. : 3,896,401

DATED : July 22, 1975

INVENTOR(S) : Takeshi Yano et al

It is certified that error appears in the above-identified patent and that said Letters Patent are hereby corrected as shown below:

Column 1, line 9 - after "flexural" delete "made" and insert --mode-- line 9 - after "resonators" (first occurrence) insert --or-- line 9 - after "longitudinal" delete "made" and insert --mode-- line 56 - insert "electro" before "mechanical"

Column 3, line 46 - delete "resanance" and insert --resonance--

Signed and Sealed this

*fifteenth* Day of *June 1976*

[SEAL]

*Attest:*

RUTH C. MASON
*Attesting Officer*

C. MARSHALL DANN
*Commissioner of Patents and Trademarks*